(12) United States Patent
Burkardt et al.

(10) Patent No.: US 6,320,602 B1
(45) Date of Patent: Nov. 20, 2001

(54) REGION LAYOUT IN A VIEW ON A GRAPHICAL DISPLAY SCREEN

(75) Inventors: Pit Burkardt, Boeblingen (DE); Roy Alan Feigel, Austin, TX (US); Jutta Land, Weil im Schoenbuch; Herbert Westermann, Sindelfingen, both of (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/483,641

(22) Filed: Jun. 7, 1995

Related U.S. Application Data

(63) Continuation of application No. 08/234,756, filed on Apr. 24, 1994, now abandoned.

(30) Foreign Application Priority Data

Apr. 30, 1993 (EP) .................................................. 93107055

(51) Int. Cl.[7] .................................................. G06F 13/00
(52) U.S. Cl. .......................................... 345/817; 345/825
(58) Field of Search .................................... 345/118, 119, 345/348–351, 333–338, 977

(56) References Cited

U.S. PATENT DOCUMENTS 5,107,443  4/1992  Smith et al. .

OTHER PUBLICATIONS

Patent Abstracts of Japan, vol. 015, No. 015 (P–1151), Jan. 11, 1991, JP–A–22 57 373.
Werdel, W.S., "Graphical Definition of Configuration Objects", *IBM Technical Disclosure Bulletin,* V. 35, N. 2, Jul. 1992, pp. 58–63.
Barker et al., "Dynamic Repositioning of Object Areas on a Page", *IBM Technical Disclosure Bulletin,* V. 32, N. 10B, Mar. 1990, pp. 77–78.
"Screenview User's Guide 1.2", IBM Publication No. SC33–6451–02.

*Primary Examiner*—Steven Saras
(74) *Attorney, Agent, or Firm*—William A. Kinnaman, Jr.

(57) ABSTRACT

A method and apparatus for laying out a plurality of instances of graphical objects within a view displayed on a graphical display device. The view contains one or more regions into which the instances may be placed. The placement is done by associating an attribute, parameter or variable with the definition of each of the instances of graphic objects. The attribute defines into which of the regions of the view the instance should be placed. Layout routines are provided to extract the value of the attribute from the definition of the instance of the graphic object and to use it to associate the instance with the region in which it is to be displayed. The layout routines then calculate an optimum display for all of the instances within the region. In addition, a method for moving the instances of the graphic objects from one region to another region This involves changing the value of the attribute and reordering the instances within the regions.

5 Claims, 9 Drawing Sheets

ROW

SROW

COLUMN

SCOLUMN

EXPAND

REGION LAYOUT IN A VIEW ON A GRAPHICAL DISPLAY SCREEN

This application is a continuation of application Ser. No. 08/234,756, filed Apr. 24, 1994, now abandoned.

TECHNICAL FIELD

The invention relates to generating views on a display screen including multiple graphic objects and to laying out graphic objects within a displayed view.

BACKGROUND ART

The IBM ScreenView product is a set of services which can be installed on an operating system for developing applications with a consistent user interface and for running these applications. ScreenView essentially consists of two parts, a Runtime Service (RTS) which provide services to applications at run time, and an Application Development Services (ADS) which support programmers to develop various user interface types for those applications which are consistent across all applications. ScreenView version 1.1. is described in the following publications:

ScreenView User's Guide (IBM Publications Number SC33-6451);

ScreenView Application Developer's Guide (IBM Publications Number SC33-6452); and ScreenView Application Developer's Reference (IBM Publications Number SC33-6453).

When working with ScreenView, all the ScreenView applications appear as a number of objects on which the end user can perform certain actions. For example, when configuring a computer system, the objects that would be seen (so-called graphic objects) include processors, disks and/or control units and the actions that may be performed would include delete, connect and/or add. ScreenView enables object sharing and eases interoperability among applications. An example of such an application is described in the IBM Technical Disclosure Bulletin, vol 35, no 2, July 1992, pp 58–63 in an article entitled "Graphical Definition of Configuration Objects".

The design of the end user interface for ScreenView applications focuses on the objects which the end user can view and manipulate. The end user interface specification is programmed using a declarative language called a user interface declaration (UID).

A view in ScreenView is a representation of details of an object, for example what the object contains, how it is composed and/or what its properties are. Views allow a user to look at details of an object and to manipulate the object. When using a graphical display device, a view could represent the picture displayed on the display screen and the objects would be shown as icons on the display screen. The term "graphic objects" is often used to describe the objects displayed on the graphical display device.

Once the objects are defined, the designer of the user interface must select the views which would give the end users the best access to the objects to enable them to fulfill their tasks. The designer must determine which graphic objects the end user needs to see simultaneously in order to be able to manipulate the object relationships. As the number of graphic objects increases, the number of relations increases dramatically. The designer must ensure that graphic objects which bear a close relationship with each other are displayed near each other on the screen.

Additional problems arise when the user is able to manipulate the interface himself so that the position of graphic objects in the view is changed. This can lead to some graphic objects being hidden under other graphic objects as the resolution of the graphical display device on which the graphic objects are placed is not sufficient to display both graphic objects simultaneously.

Known from the prior art is an article entitled "Dynamic Repositioning of Object Areas on a Page" in the IBM Technical Disclosure Bulletin, vol 32, no 10B, March 1990, pp 77–78. In this article, a reusable shell-layout definition for a page in a document is used to provide automatic changes to the layout of the page as information is placed into object areas.

SUMMARY OF THE INVENTION

An object of the invention is to provide a flexible means for laying out graphic objects in a view on a display screen. This object is solved by defining with the view region and associating with the graphic objects region attributes to indicate in which of the regions the graphic object is located. The structure of the regions are described in region definition files.

Layout routines are provided which loop through all the graphic objects to be positioned in one of the views to extract the region attributes and to lay the graphic objects out in the regions. Moving routines are also provided which change the region attributes when one of the graphic objects is moved from one of the regions to another of the regions.

The object is also solved by a method including a first step of defining the view within which the graphic objects are to be displayed, a second step of defining regions within the view within which some of the graphic objects are to be displayed, a third step of associating with some or all of the graphic objects a region attribute to indicate within which of the regions the graphic object is to be displayed, a fourth step of laying out the graphic objects within the regions, and a fifth step of presenting the laid out view on the graphical display apparatus.

The second step of the method includes creating a region definition file containing the definitions of the regions.

The fourth step of the method includes looping though the graphic objects to be positioned in the view to extract the value of the region attribute, searching through the region definition file to select the region corresponding to the extracted region attribute, and positioning the graphic objects within the selected region. The step of positioning the graphic objects includes passing all the graphic objects within the selected region together with the region size, region shape and region layout to a sub-layouter which then determines the optimal positions of the graphic objects within the selected region.

The invention also provides a method of moving a graphic object within a view with regions including a first step of selecting the graphic object to be moved, a second step of selecting the new position to which the graphic object is to be moved, a third step of placing the graphic object to the selected new position and a fourth step of reordering the view.

In this second step the region is determined in which the selected new position is located and in the third step the value of the region attribute is changed from the region in which the graphic object is located to the region in which it is to be located.

The apparatus and method as described and claimed has the advantage over the prior art in that it provides a flexible and comprehensive method of displaying a view on a display device. The developer of an applications program does not need to concern himself in great detail about the position and display of the graphic objects on the display device, he will merely need to define the regions and associate with each object to be displayed a region attribute. The layout routines will then ensure that each graphic object is visibly displayed within the region.

For the end user of the applications program, the inventive method and apparatus has the advantage that he or she is able to manipulate the instances of the graphic objects on the display device and reposition them. The moving and layout routines then reorder the display so as to produce an improved layout.

A further feature of the invention ensures that an end user may not manipulate an instance of a graphic object in an unallowed manner. This has the advantage that instances of graphic objects in a view which must be always kept together or which may only move from one region to another will only be allowed to undergo these actions. The end user cannot therefore reorder the view in a manner which would later complicate the use of the applications program.

BEST MODE FOR CARRYING OUT THE INVENTION

Figure 1:
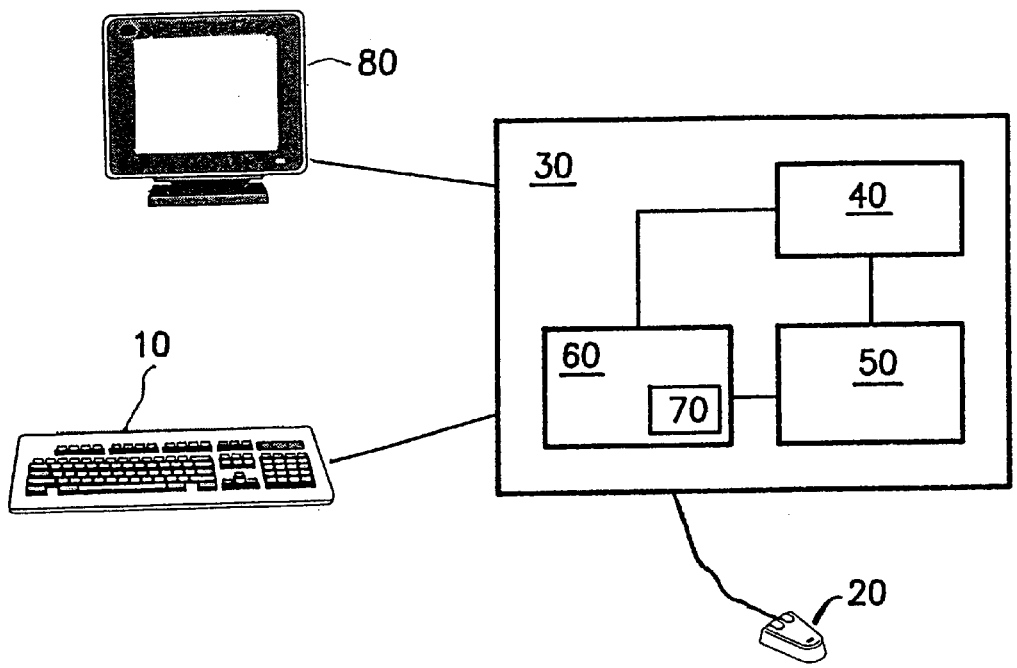
FIG. 1 shows an overview of a computing system in which the invention is implemented.

FIG. 1 shows an overview of a computing system in which this invention is implemented. A keyboard 10 and a pointing device 20, such as a mouse, are connected to a computing unit 30. The computing unit 30 contains a central processing unit 40 and memory 60. The computing unit 30 may also contain a graphics processor 50 to generate a graphical interface to programs running in the central processing unit 40 or the central processing unit 40 may itself generate the graphical interfaces.

The memory 60 contains an image memory 70 which is used to store and present the graphical interface on a display screen 80. The graphical interfaces presented on the display screen 80 are merely one example of end user interfaces that may be generated to operate with applications programs running in the computing unit 30. Other examples of end user interfaces are command-based interfaces or speech interfaces.

In order to generate the end user graphical interfaces to be produced on the display screen 80, the developer of the applications program has to define the layout and positions of the items to be displayed on the screen. Factors to be taken into account when designing the layout are the ease of use for the user of the applications program, the clarity of the screen and the ease of navigation through the various screens forming the end user graphical interface.

In the IBM ScreenView product, the logic for designing the end user interfaces (the so-called Interface Logic) is separated from the logic that is part of the applications program (the so-called Business Logic). The end user interfaces to the applications program in ScreenView are defined with the help of a so-called User Interface Declaration (UID). As explained above, this is a declarative language which allows the developer to describe the objects, their relationships with each other, the possible views in which these objects are presented in a graphical end user interface and the actions that may be performed on the objects. The development of a UID is described in detail in the above-referenced ScreenView Application's Developer's Guide.

Although the UID is generically defined, i.e. without reference to the particular end user interface being used by the end user of the applications program, it does allow the incorporation of view definitions so that, should the end user select an end user graphical interface, the position of the objects on the display screen 80 can be calculated.

Within ScreenView, views are defined as being the representation of details of an instance of a graphic object. They include details of what the graphic object contains, how it is composed and what its properties are. Views allow the end user of the applications program to look at the details of the graphic objects and to manipulate the instances of the graphic objects. In order to allow the graphic object to be looked at from different perspectives or in differing ways, there can be more than one view on any graphic object.

Once an object is defined, the designer of the graphical interface has to determine the views which would give the end users the best access to the graphic objects displayed on the display screen 80 and enable them to fulfill their tasks. The designer must determine which graphic objects the end user of the applications program needs to see simultaneously and the order in which the end user needs to see them in order to be able to manipulate the object relationships.

As explained above, these views are defined in the UID. A view is defined by specifying the graphic object, the view contents and the view presentation. The graphic object is the object on which the view can be opened. This object is also termed a "View Owner". In the UID, it is possible to specify the views that the end users can open on each of the graphic object's instances. The view contents describe the contents of the graphic object, i.e. which other graphical objects it may contain. The view presentation describes the basic presentation aspects of the view and is also defined in the UID. The view presentation may describe the bitmaps or icons which are used for display the instances of the graphic objects on the display screen 80. It may describe the background picture or bit map upon which the instances of the graphic objects are displayed. The view presentation also specifies the layout routines which are to be used to arrange the instances of the graphic objects on the display screen 80.

The presentation of the same graphic object may differ from view to view. It is possible for the end user to open as many views on the same graphical object as is desired. These views are stored in the image memory 70 or, if the memory is not sufficient to hold all the opened views, may be temporarily stored in other storage medium such as a hard disc.

The medium used to present views to the end user is a window. When a view of a graphical object is opened, a window is created which will show all of part of the view contents on the display screen 80.

Figure 2:
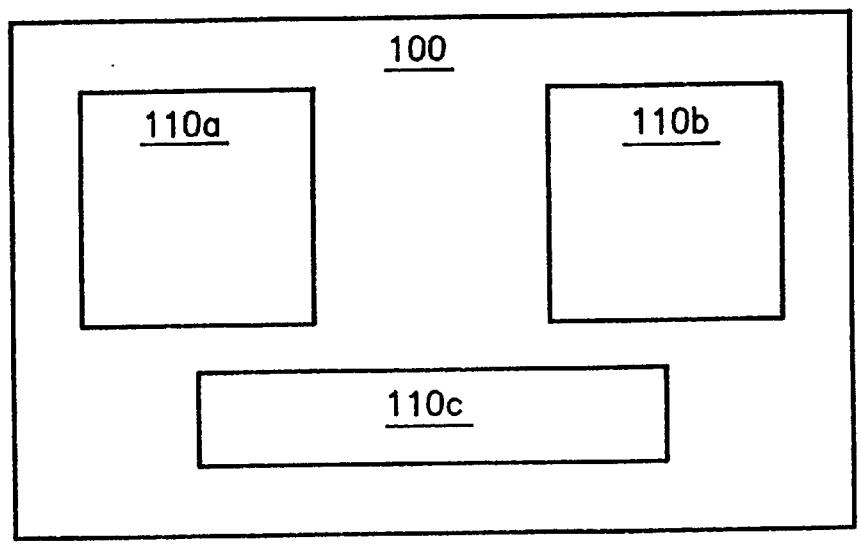
FIG. 2 shows a view in which three regions are present.

Each view may be divided into one or more regions as shown in FIG. 2. In FIG. 2, a view 100 contains three regions 110a–c. This is merely an example of a possible division of the view 100. The view 100 may contain more than three regions 110a–c. The three regions 110a–c may be of differing sizes and may overlap. In the preferred embodiment, the regions are rectangular in shape, they could however be of different shapes.

For each view 100 defined in the user interface declaration, a region definition file may be referenced. This file contains one or more region definitions. The region definition consists basically of a region name and a pair of co-ordinates that define the rectangular area making up the region 110 in the view 100. In addition, the name of a region attribute may be specified per view. The value of this region attribute is used by a layout routine in order to determine the region 110 into which the instance of the graphical object is positioned, as is described later.

Figure 3:
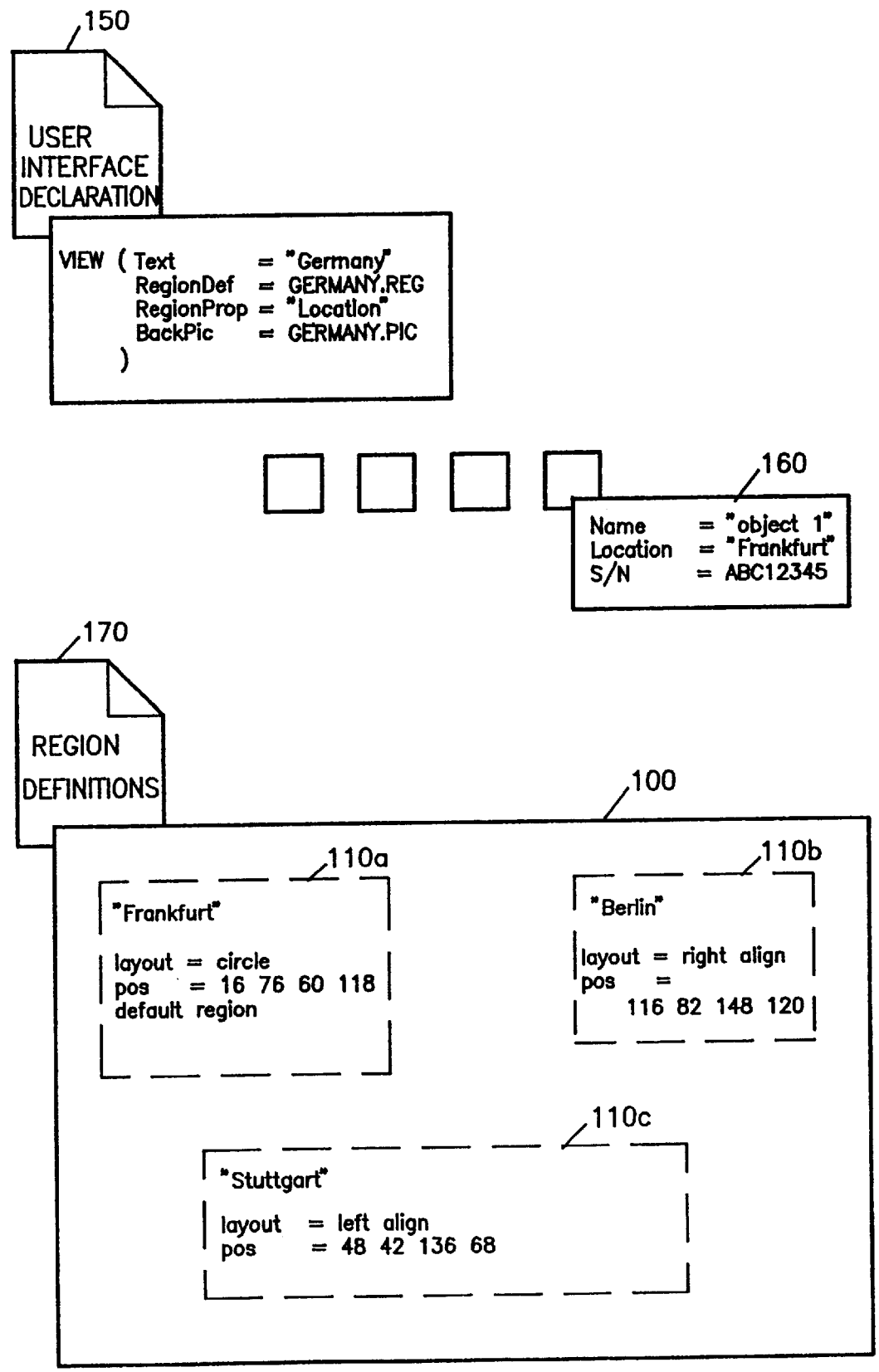
FIG. 3 shows how the region definitions are included in the user interface definition.

In FIG. 3 are shown an example of a definition of a view 100 in a user interface declaration 150, a definition 160 of an instance of a graphical object and a region definition file 170.

The definition of the view 100 shown in FIG. 3 is only a short portion of the declarative language program in which the view 100 is defined. In the example shown, the view 100 is given the name "Germany", the associated region definition file (RegionDef) 170 is called GERMANY.REG, the region attribute (RegionProp) used by the layout routine is called "Location". The back picture of the view is stored in the bitmap file GERMANY.PIC.

The definition 160 of an instance of the graphical object includes the name of the object "object 1" and the value of the region attribute used by the layout routine. In the example of FIG. 3, the region attribute takes the value "Frankfurt", as is shown by the statement "Location= Frankfurt".

The region definition file 170 associated with the view 100 with the name "Germany" has three regions 110a–c defined. That is to say, there are three regions 110a–c within the view 100 into which instances of the graphic objects can be positioned. It should be noted that the instances of the graphic objects need not necessarily be positioned within any one of the regions 110a–c. They might be positioned in that portion of the view 100 in which none of the regions 110a–c are present. This will happen if the end user positions the object in this portion of the view or if no matching region for the value of the region attribute (Region Prop) is found and no default region is defined.

In the region definition file 170, the names of the regions 110a–c are given. In the example shown, the regions 110a–c have the names "Frankfurt", "Berlin" and "Stuttgart", respectively. These names correspond to the values which the region attribute (RegionProp) can assume. Thus the instance of the graphic object shown in definition 160 will be placed in the region 110a with the name "Frankfurt". Also included in the region definition file 170 are the corner coordinates of the rectangle defining the regions 110, i.e. the position that each of the regions 110 assume within the view 100.

Information about the form of the layout of the instances of the graphic objects within the regions 110a–c is also included in the region definition file 170. In the preferred embodiment, a number of layout types are known. These are shown in FIGS. 4A–4H.

Figure 4A:
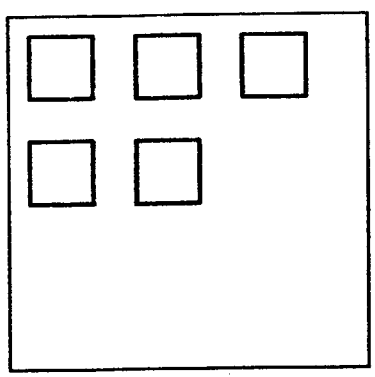
FIG. 4 shows the various types of layouts of graphic objects that may be performed within the regions.
Figure 4B:
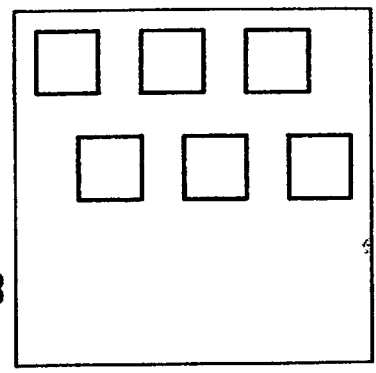
Figure 4C:
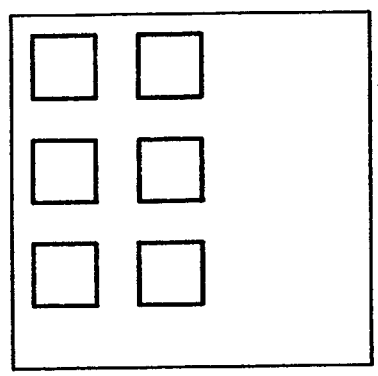
Figure 4D:
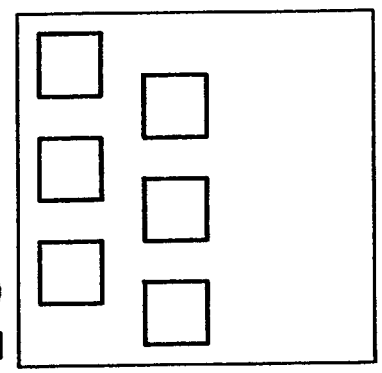
Figure 4E:
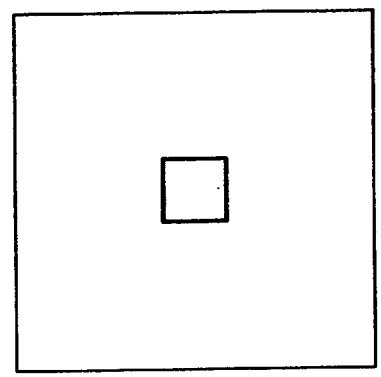
Figure 4F:
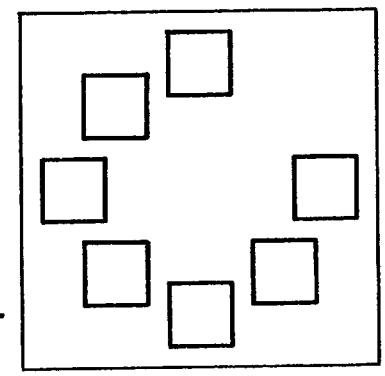
Figure 4G:
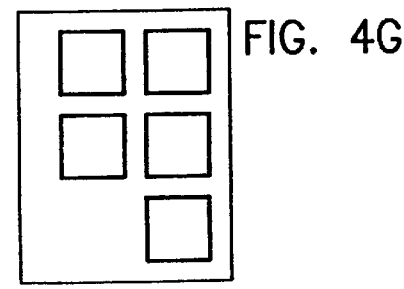
Figure 4H:
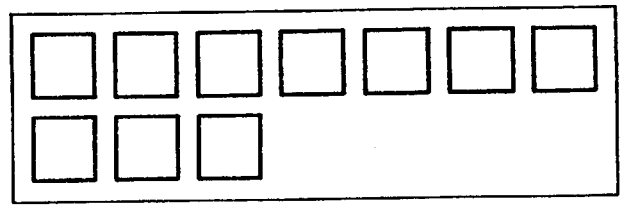

FIG. 4A shows the graphic objects laid out in rows. It is termed a "Row" layout type. FIG. 4B shows the graphic objects laid out in rows in which the rows are shifted with respect to one another. It is termed an "SROW" layout type. FIG. 4C shows the graphic objects laid out in columns. It is termed a "COLUMN" layout type. FIG. 4D shows the graphic objects laid out in columns with the columns shifted with respect to one another. It is termed an "SCOLUMN" layout type. Finally FIG. 4E shows an "EXPAND" layout type in which the graphic objects are placed in the middle of the region 110a–c. The graphic objects may be left aligned, i.e. the instances of the graphic objects are aligned to the left hand bottom corner of the region as shown in FIG. 4H. The graphic objects may be right aligned, i.e. the instances of the graphic objects are aligned to the right hand top corner of the region as shown in FIG. 4G. Finally the instances of the graphic objects may appear in a circle as shown in FIG. 4F. Other arrangements are conceivable.

In the example shown in FIG. 3, the region 110a with the name "Frankfurt" has a circular layout, indicated by the parameter "layout=circle". The region 110b with the name "Berlin" has a right aligned layout, indicated by the parameter "layout=right align". Finally the region 110c with the name "Stuttgart" has a left aligned layout, indicated by the parameter "layout=left align".

One region within the region definition file 170 is defined as the default region. Into this region are placed all the instances of the graphical objects which are not, by the value of the region attribute RegionProp, placed into any other region. In the example shown in FIG. 3, the region "Frankfurt" 110a is the default region. Other regions 110b or 110c could equally be the default region. Alternatively, it would be possible to define the portion of the view 100 outside any of the regions 110a–c to be the default region by not specifying a default region.

Figure 5:
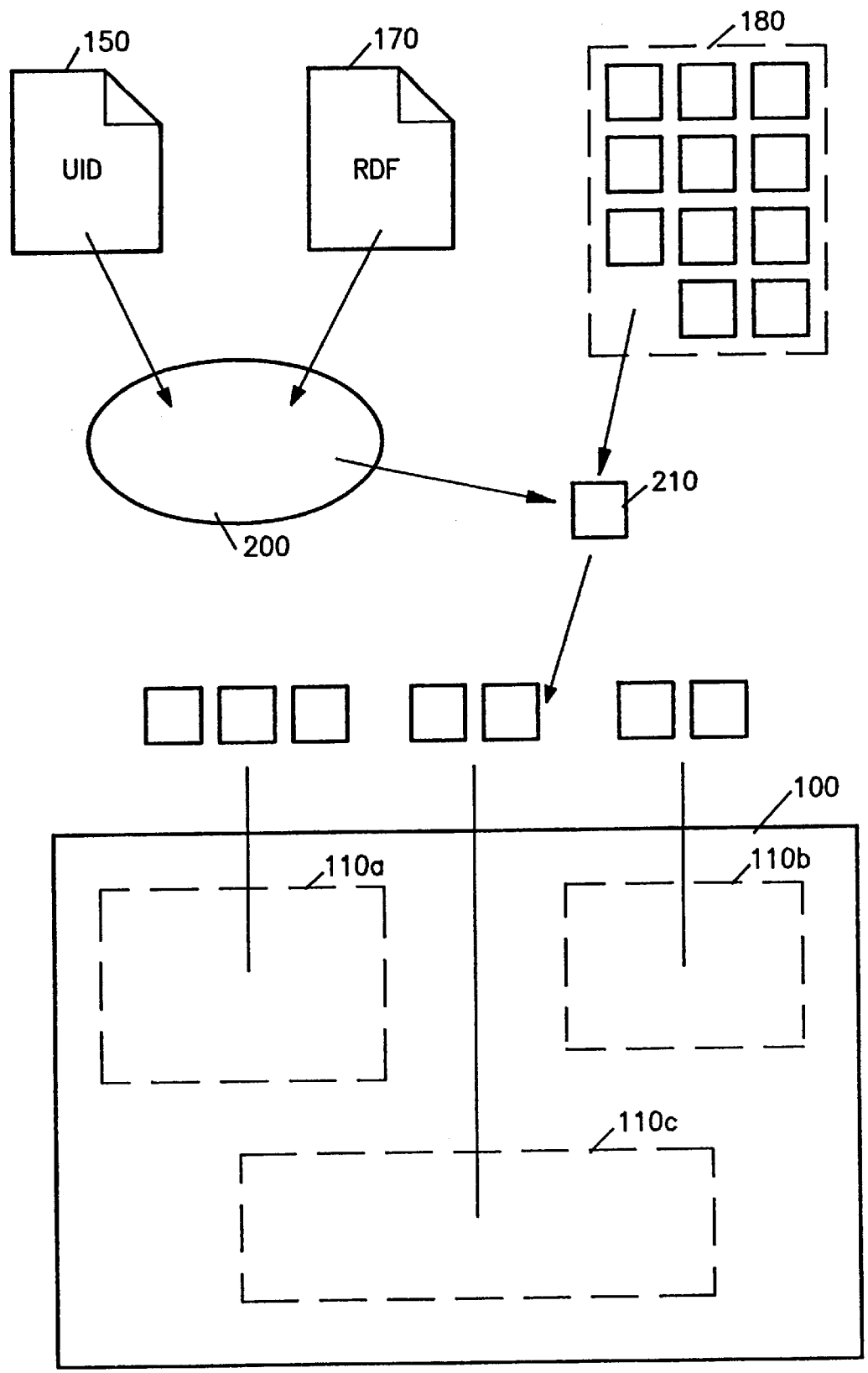
FIG. 5 shows an overview of one embodiment of the invention.

FIG. 5 shows an embodiment of the invention. Within the computing unit 30, the various components of the invention are present. The universal interface declaration 150 is stored in the memory 60 as is the region definition file 170. The memory 60 also contains instances 180 of the graphic objects which are to be positioned within the view 100.

Within the graphics processor 80, a region layouter 200 is provided which lays out the instances 180 of the graphic objects in the view 100. The region layouter 200 extracts from the memory 60 an instance 210 of the graphic object and controls the positioning of the instance 210 of the graphic object within the view 106 as will be explained below.

Figure 6:
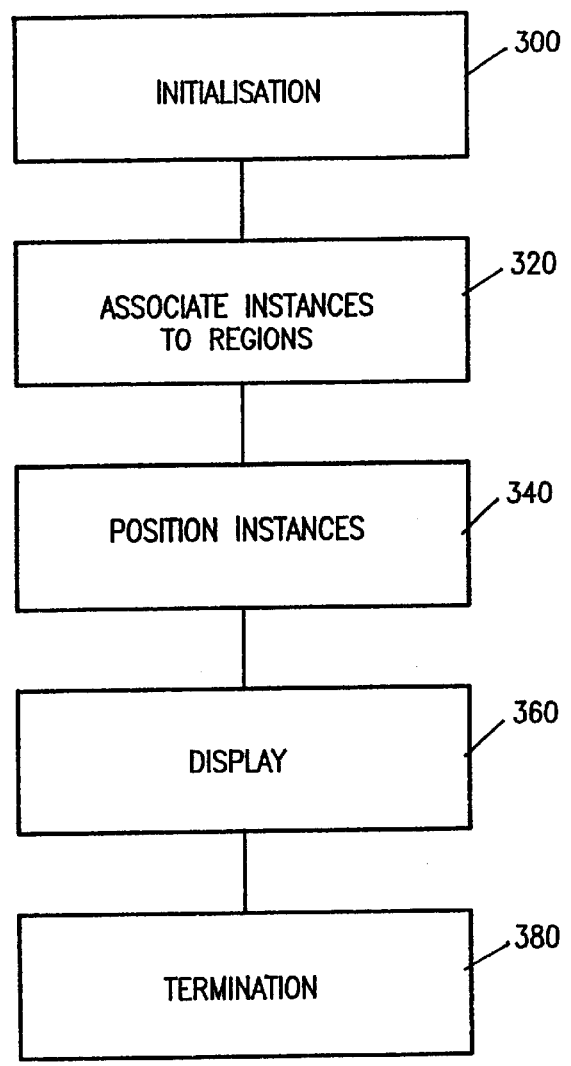
FIG. 6 is a flow diagram showing an outline of the method of the invention.

FIG. 6 is a flow diagram illustrating the general principles of the invention. The method of displaying the graphic objects basically consists of five steps. In the first step 300, the region layouter is initialized. This involves retrieving the region definition file 170 from the memory 60 and creating a structure in memory as will be explained below. The next step 320 involves extracting the instances 180 of the graphic objects to be displayed and associating them with the correct one of the regions 110a–c in which they are to be displayed. In the third step 340, the instances 180 are positioned within the associated one of the regions 110a–c and in the fourth step 360 a window on the view 100 is created and displayed on the display screen 80. Finally, in step 380, the method is terminated and the space in memory 60 used by the created structure freed for other uses.

Figure 7:
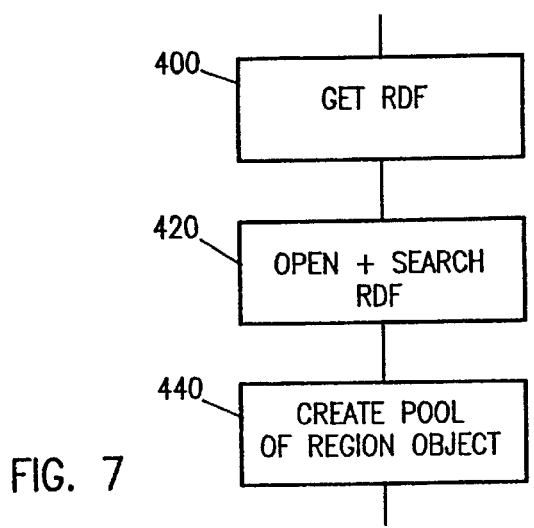
FIG. 7 is a flow diagram illustrating how a memory structure is created to access the region and object definition data.
Figure 8:
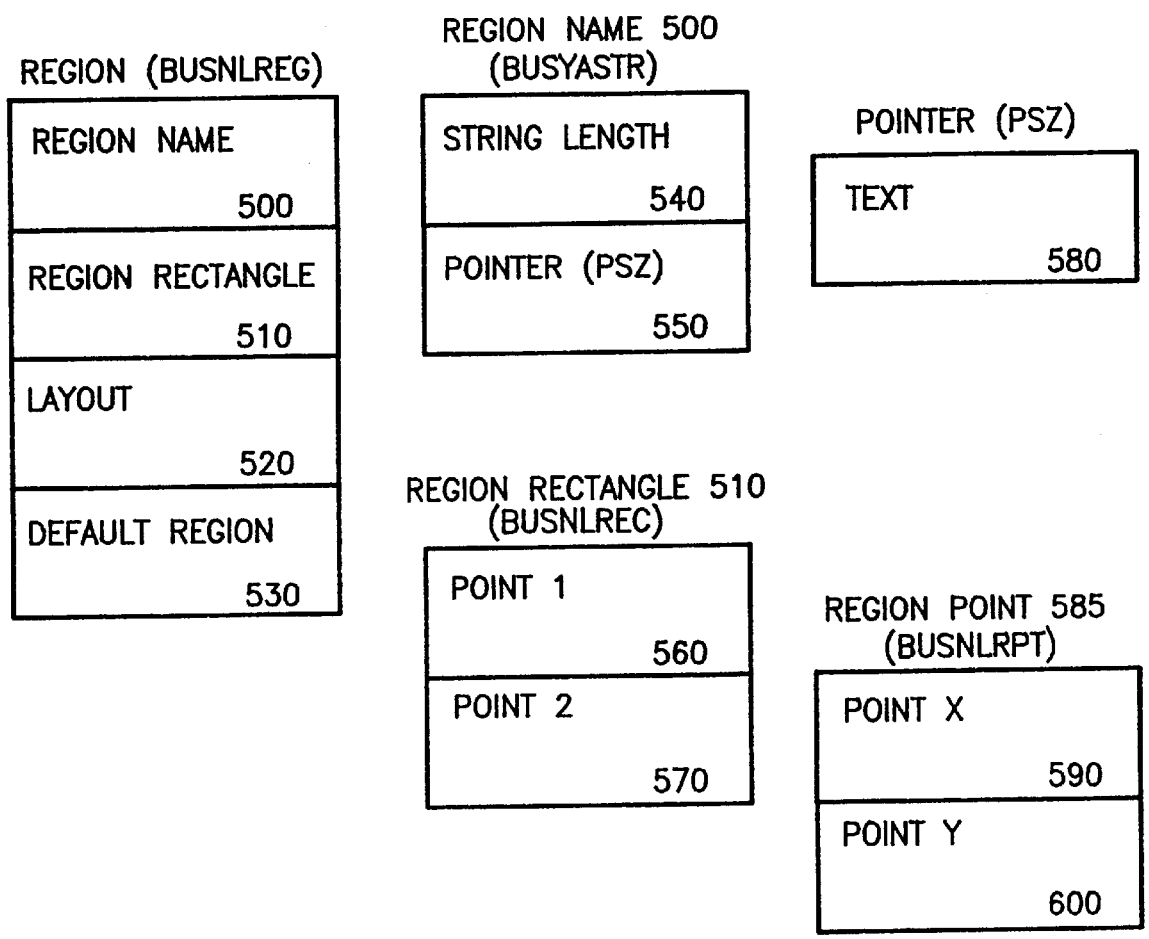
FIG. 8 shows the various child objects of the graphic object to be displayed and their properties.

The first step 300 of FIG. 6 comprises a number of smaller steps as shown in FIG. 7. In step 420, the region definition file (RDF) 170 is retrieved from the memory 60. In the actual ScreenView implementation, the region definition file 170 is converted into a region Abstract Syntax Table (AST) which is a machine readable form of the region definition file 170. In step 420, the region Abstract Syntax Table is opened and searched. For each region definition found in the region definition file 170, a pool of region objects (BUSNLREG) is created as shown in FIG. 8. The region object (BUSNLREG) includes a region name object (BUSYASTR) 500, a region rectangle object (BUSLNREC) 510, details of the layout 520 which the region 110 has and an indication 530 whether the region 110 is the default region or not.

The region name object (BUSYASTR) 500 has two properties associated with it, a pointer (PSZ) 550 to text 580 stored in the memory 60, and a string length variable 540 to indicate the length of the text 580.

The region rectangle object (BUSNLREC) 510 has two pointers 560, 570 associated with it. One region pointer (Point_1) 560 points to the coordinates 590 of one corner of the region rectangle. The other region pointer (Point_2) 570 points to the coordinates 600 of the other corner of the region rectangle. The coordinate pairs are contained in a region point object (BUSNLRPT) 585 also stored in the memory 60.

The pointers to the region objects (BUSNLREG) are stored in a dictionary implemented as an AVL-tree. AVL-trees are data structures well known in the prior art. Using the region name 500 as a key, it is possible to rapidly search the dictionary and locate the pointer which points to the position of the region objects (BUSNLREG) within the region definition pool.

Figure 9:
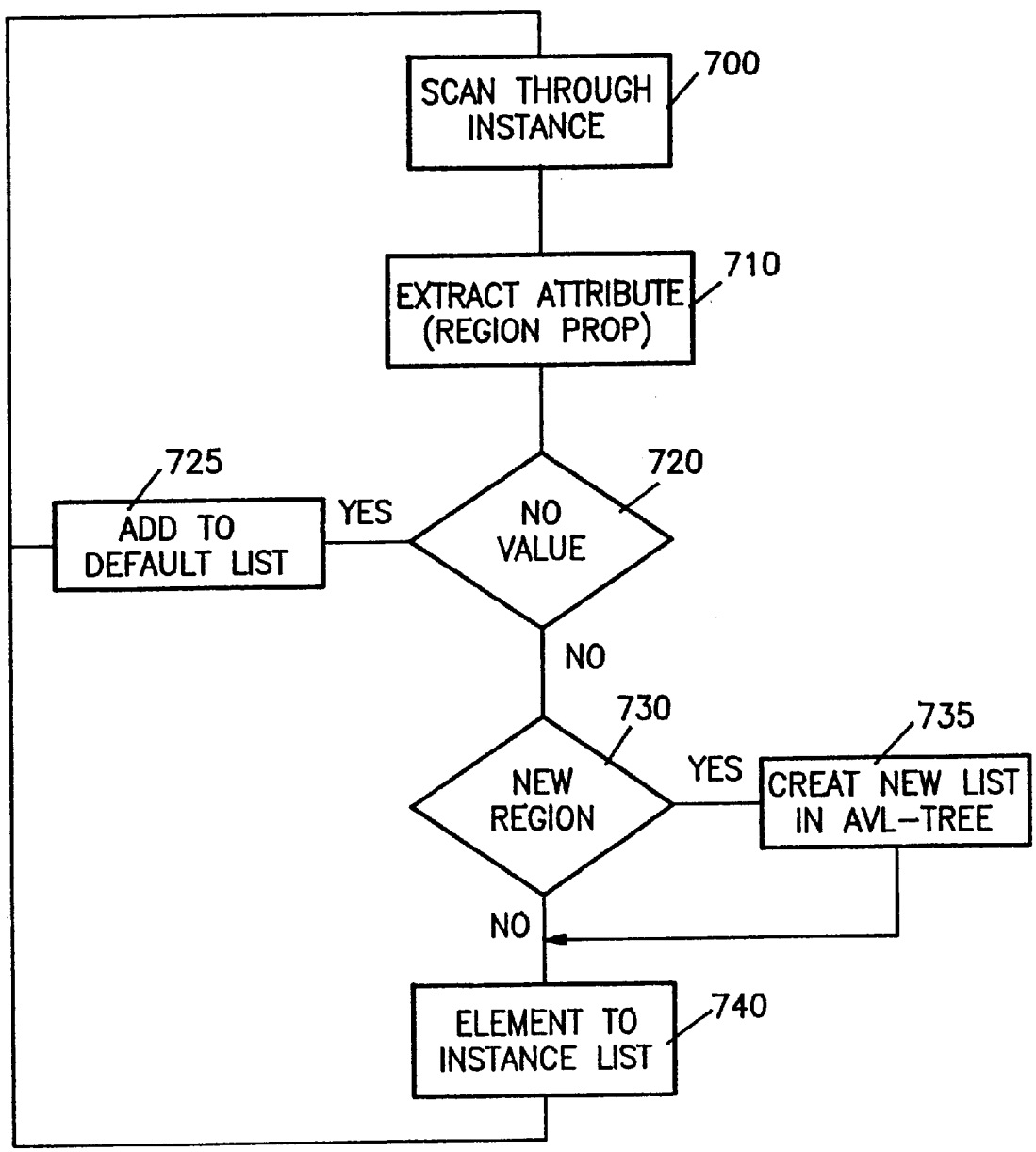
FIG. 9 is a flow diagram illustrating the method of associating instances of graphic objects to regions.

The second step 320 of FIG. 6 is shown in more detail in FIG. 9. In step 700, the instances 180 of the graphic objects which are to be displayed in the view 100 are scanned and, for each instance the value of the region attribute (RegionProp) is determined (step 710). In step 720, a check is carried out to see whether the region attribute (RegionProp) has an assigned value or not. If a value is assigned to the region attribute (RegionProp), then the next step 730 is carried out and a check made to see whether any previous instance 180 had the same region attribute (RegionProp) value. If this is not the case, then in step 735, the region name (BUSNLREG) of the region 110 in which the instance 180 appears is placed in a Region Name AVL tree together with a pointer to a new instance list created in the memory 60. The name of the instance is placed as an element in the instance list (step 740). If, however, a previous one of the instances 180 had already had the same region attribute (RegionProp) value, then an instance list will already have been created in the memory 60 and only the name of the instance need be added as an element to the instance list. The scanning procedure (step 700) proceeds until all of the instances 180 of the graphic objects which appear in the view 100 have been scanned.

In step 720, if the value of the region attribute (RegionProp) is found to be not assigned, then the name of the instance 180 is added as an element to the instance list associated with the default region 530.

Having created the AVL trees and instance lists, one can proceed to step 340 of FIG. 6. In this step the instances 180 of the graphic objects are positioned within their respective regions 110. If only one instance 180 is to be positioned within the region 110, then the icon or bitmap representing the instance 180 of the graphic object is placed in the center of the region 110. The size of the icon may be adjusted so that it fills the region 110 if required.

Figure 10:
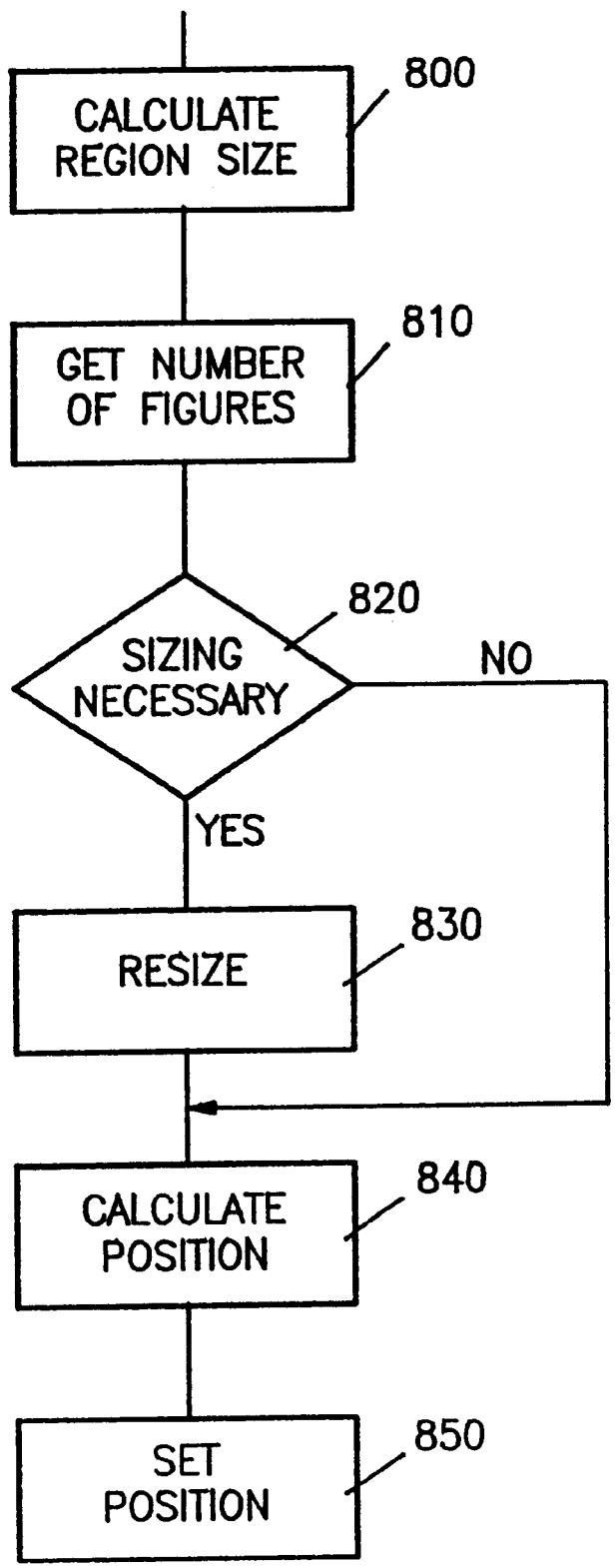
FIG. 10 is a flow diagram illustrating the layout of the instances of graphic objects within the views.

If, however, more than one instance is to be placed within the regions 110a–c, then the procedure as shown in FIG. 10 is carried out. In step 800, the size of the region 110 is calculated using the values of point_1 560 and point_2 570 in the region rectangle object (BUSNLREC) 510. From the instance list, the number of instances of graphic objects in each of the regions 110a–c is calculated (step 810). In step 820, a check is carried out to see whether the icons or bitmaps representing the graphic objects can all fit within the respective one of the regions 110a–c using the chosen layout type. If this is not the case, then a resizing operation is carried out (step 830). The resizing operation could consist of replacing the original icon with another, simplified icon or merely reducing the size of the original icon. Alternatively, the graphic objects could be laid on top of each other. Other resizing methods are well known to those skilled in the art.

In step 840, the position of the icons or bitmaps within the region 110 are calculated using the region layouter 200 with the layout parameter 520. Finally, in step 850, the complete region 110 can be generated and, if appropriate, stored in the image memory 70. The routines which carry out the layout procedure are found in the region layouter 200. Three separate routines or sub-layouters are used to generate the three different types of layouts in the preferred embodiment of the invention. The choice of which layouter to use is governed by the value of the layout parameter 520. The development of further sub-layouters would be possible for a man skilled in the art.

Steps 320 and 340 are repeated until all of the instances 180 of the graphic objects to be displayed in the view 100 have been positioned within the appropriate regions 110a–c. The data representing the view 100 is then found in the image memory 70 and a window is created using known image processing techniques in order to display this view 100 on the display screen 80.

Figure 11:
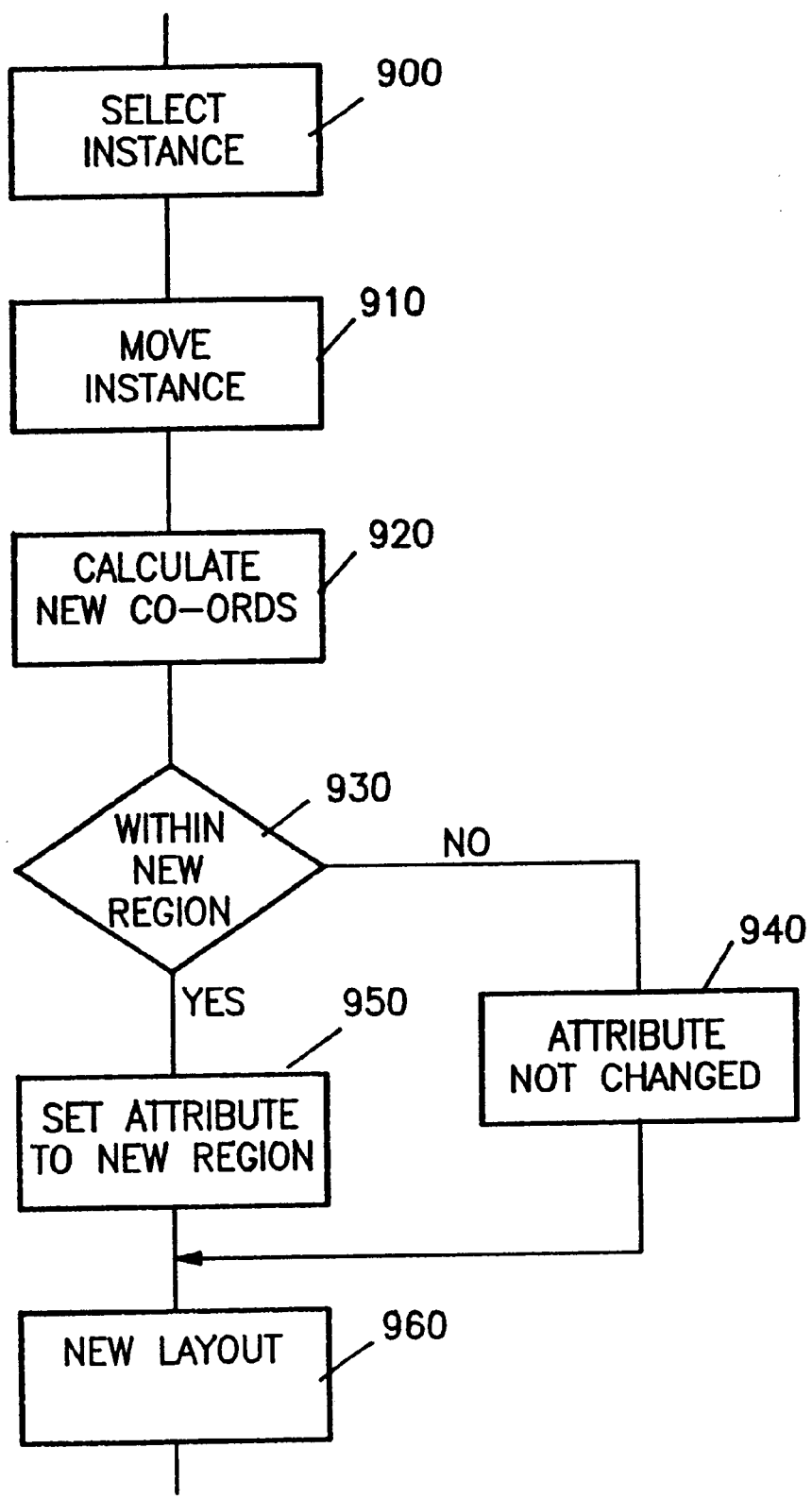
FIG. 11 is a flow diagram illustrating the method of moving a instance of the graphic object from one region to another region.

The invention also incorporates moving routines to allow an end user to move instances of graphic objects from one of the regions 110a–c to another one of the regions 110a–c using "drag and drop" techniques. A flow diagram representing this procedure is shown in FIG. 11.

In step 900, the end user selects the instance 180 of the graphic object which is to be repositioned. The selection of this instance 180 is actuated by the pointing device 20 or by using a command from the command line. Using the pointing device 20 or a command entered on the command line, the instance 180 is moved from its current position in the view 100 to another position in the view 100 (step 910). In step 920, the new coordinates of the instance 180 of the graphic object are calculated. Then, using the information stored in region rectangle (BUSNLREC) object 510, a check (step 930) is carried out to see whether these new coordinates are within a new region 110.

If the end user has moved the instance 180 to a position within no defined region, then the value of the region attribute (RegionProp) is not changed (step 940). If, however, the instance has been moved within a new region (step 950) then the value of the region attribute (RegionProp) is set to the value of the region 110 in which the instance is located. This value is extracted from the region name (BUSYASTR) object 500. It is, of course possible that two regions 110 overlap in which case only one of the region names is chosen as the value of the region attribute.

In step 960, the sub-layouter in the layouter 200 is called in order to reorder the displayed icons and bit maps within the region 110 so as to incorporate the moved instance. If the instance 180 has been moved to a position within no defined region and the region attribute (Region Prop) has not been changed (step 940), then it will be replaced in the original region 110.

In some embodiments of the invention, it may not be possible for the end user to move the instance 180 of the graphic object from one region 110 to another region 110. In this case, the graphic object will respond to a "drop and drag" request either by rejecting the request and leaving the value of the region attribute (RegionProp) unchanged or by changing it to another value (e.g. the name of another region in which the instance of the graphic object may appear).

An example of the view "Germany" can be used to indicate this. Suppose the end user wishes to drag an object "aeroplane" currently in the region "Frankfurt", i.e. whose region attribute (RegionProp) has the value "Frankfurt" to the region "Berlin". Three possibilities are open. In the first possibility, the value of the region attribute (RegionProp) "Location" will be changed to "Berlin" and the region "Berlin" will be reordered to include the object "aeroplane".

In a second possibility, the end user drags the object "aeroplane" to the region "Berlin" and drops it there. The graphic object, however, rejects the request and refuses to change the value of the region attribute (RegionProp) "Location" to "Berlin". The value remains set to "Frankfurt". The object "aeroplane" remains positioned within the region "Frankfurt".

In a third possibility, the end user drags the object "aeroplane" to the region "Berlin" and drops it there. The graphic object, however, rejects the request to change the value of the region attribute (RegionProp) "Location" to "Berlin" since it knows that all objects going from the region "Frankfurt" must first go to the region "Stuttgart". It therefore changes the value of the region attribute (RegionProp) "Location" to "Stuttgart" and the region layouter 200 is called to reposition the instances of the objects within the region "Stuttgart".

A further possibility is that the end user drags the graphic object "aeroplane" from the region "Frankfurt" to a portion of the view 100 containing no region 110. In this case, the value of the region attribute (RegionProp) "location" will be changed to "default". In the particular example, this will mean that the object "aeroplane" remains located within the region "Frankfurt" since that is the default region for this view 100. However, should at a later stage, the default region be altered, then the instance of the graphic object "aeroplane" will appear in the new default region.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. An apparatus for displaying a plurality of graphic objects within a view on a display, comprising:
   a) means for defining a view having a plurality of regions within which the graphic objects are to be displayed;
   b) means for associating each graphic object with a particular region of the view to indicate the region within which the graphic object is to be displayed;
   c) means for defining for each of said regions a pattern for the positioning of graphic objects within said region, said pattern being defined without regard to the number of graphic objects that may be associated with said region, wherein each of said defined patterns is selected from a plurality of patterns;
   d) means for dynamically positioning the graphic objects associated with each of said regions within the region in accordance with the pattern defined for said region; and
   e) a display for displaying the view including the graphic objects within the associated regions.

2. A data processing system for displaying a plurality of graphic objects within a view on a display, comprising:
   a) processing means for processing data;
   b) memory for storing data to be processed;
   c) means for defining a view having a plurality of regions within which the graphic objects are to be displayed;
   d) means for associating each graphic object with a particular region of the view to indicate the region within which the graphic object is to be displayed, said association to be stored in memory;
   e) means for defining for each of said regions a pattern for the positioning of graphic objects within said region, said pattern being defined without regard to the number of graphic objects that may be associated with said region, wherein each of said defined patterns is selected from a plurality of patterns;
   f) means for dynamically positioning the graphic objects associated with each of said regions within the region in accordance with the pattern defined for said region; and
   g) a display for displaying, in response to said processing means, the view including the graphic objects dynamically positioned within the associated regions.

3. A method of displaying a plurality of graphic objects within a view on a display, comprising the steps of:
   a) defining a view having a plurality of regions within which the graphic objects are to be displayed;
   b) associating each graphic object with a region of the view to indicate the region within which the graphic object is to be displayed;
   c) defining for each of said regions a pattern for the positioning of graphic objects within said region, said pattern being defined without regard to the number of graphic objects that may be associated with said region, wherein each of said defined patterns is selected from a plurality of patterns;
   d) dynamically positioning the graphic objects associated with each of said regions within the region in accordance with the pattern defined for said region; and
   e) displaying on the display the view including the graphic objects dynamically positioned within the associated regions.

4. An apparatus for displaying a plurality of graphic objects within a view on a display, comprising:
   a) means for defining a view having a plurality of regions within which the graphic objects are to be displayed;
   b) means for associating each graphic object with a particular region of the view to indicate the region within which the graphic object is to be displayed;
   c) means for defining for each of said regions a pattern selected from a plurality of patterns for the positioning of graphic objects within said region, said pattern being defined without regard to the number of graphic objects that may be associated with said region;
   d) means for positioning the graphic objects associated with each of said regions within the region in accordance with the pattern defined for said region; and
   e) a display for displaying the view including the graphic objects within the associated regions.

5. A method of displaying a plurality of graphic objects within a view on a display, comprising the steps of:

a) defining a view having a plurality of regions within which the graphic objects are to be displayed;

b) associating each graphic object with a region of the view to indicate the region within which the graphic object is to be displayed;

c) defining for each of said regions a pattern selected from a plurality of patterns for the positioning of graphic objects within said region, said pattern being defined without regard to the number of graphic objects that may be associated with said region;

d) positioning the graphic objects associated with each of said regions within the region in accordance with the pattern defined for said region; and e) displaying on the display the view including the graphic objects dynamically positioned within the associated regions.

* * * * *